United States Patent [19]

John, Jr. et al.

[11] Patent Number: 5,068,083

[45] Date of Patent: Nov. 26, 1991

[54] DASHPOT CONSTRUCTION FOR A NUCLEAR REACTOR ROD GUIDE THIMBLE

[75] Inventors: Clarence D. John, Jr., Penn Hills, Pa.; James A. Sparrow, Columbia, S.C.

[73] Assignee: Westinghouse Electric Corp., Pittsburgh, Pa.

[21] Appl. No.: 529,845

[22] Filed: May 29, 1990

[51] Int. Cl.$^5$ ............................................. G21C 3/32
[52] U.S. Cl. .................................. 376/449; 376/353; 376/236; 376/451; 376/234
[58] Field of Search ............... 376/353, 347, 234, 236, 376/449, 451

[56] References Cited

U.S. PATENT DOCUMENTS

| | | | |
|---|---|---|---|
| 3,562,109 | 2/1971 | Bezold et al. | 176/36 |
| 3,959,072 | 5/1976 | Dupen | 176/35 R |
| 4,073,684 | 2/1978 | Cepkauskas | 376/233 |
| 4,173,511 | 11/1979 | Dietrich et al. | 176/36 R |
| 4,229,256 | 10/1980 | Luetzow | 176/365 |
| 4,326,922 | 4/1982 | Ferrari et al. | 376/435 |
| 4,659,538 | 4/1987 | Leclercq | 376/364 |
| 4,665,990 | 4/1987 | Leclercq | 376/225 |
| 4,707,329 | 11/1987 | Freeman | 376/449 |

Primary Examiner—Donald P. Walsh
Assistant Examiner—Meena Chelliah

[57] ABSTRACT

A dashpot in a control rod guide thimble for a nuclear fuel assembly includes a lower tubular portion of an elongated main tube of the guide thimble, an auxiliary hollow tube inserted in the lower portion of the main tube, and an end plug attached to a lower end portion of the auxiliary tube. The auxiliary tube has an outside diameter slightly less than an inside diameter of the main tube to permit a close fitting relationship between an exterior surface of the auxiliary tube and an interior surface of the main tube lower portion. The auxiliary tube also has an upper end portion with an inside surface portion in axial cross-section flaring upwardly and outwardly to provide a tapered transition extending between and connecting an interior surface of the auxiliary tube with the exterior surface thereof.

19 Claims, 12 Drawing Sheets

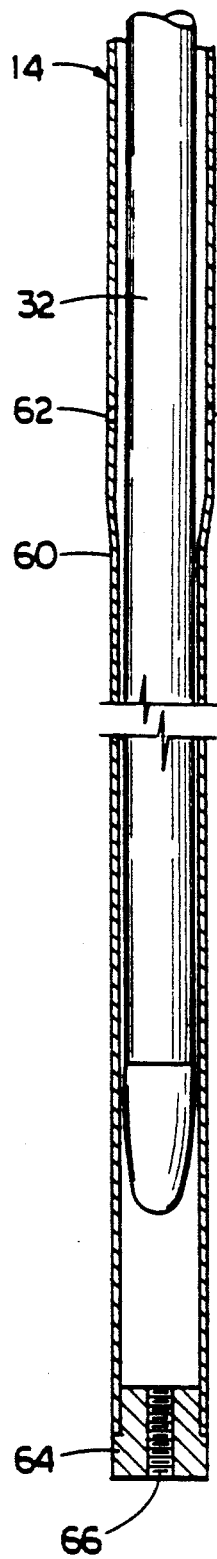
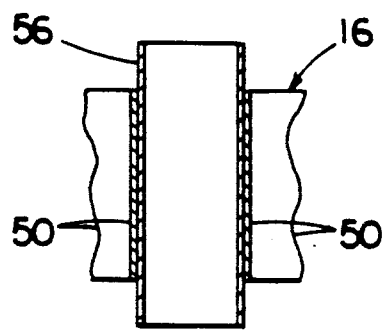
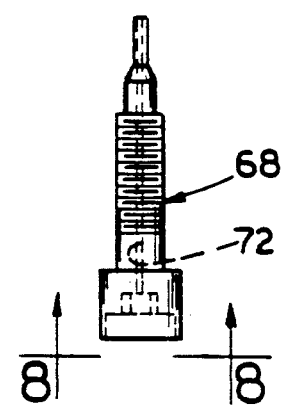
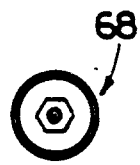
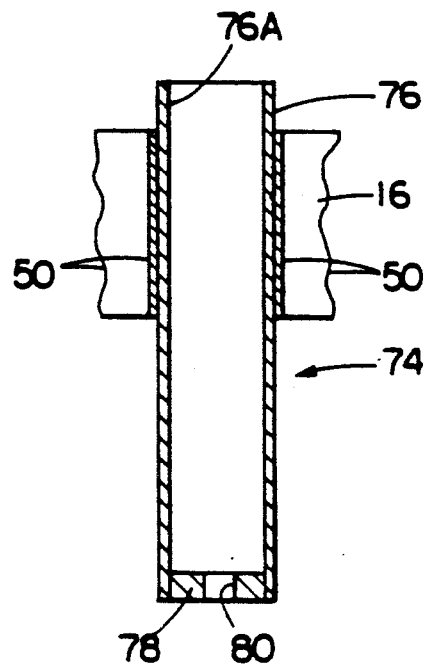
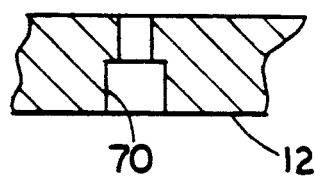
FIG. 3 (PRIOR ART)
FIG. 4 (PRIOR ART)
FIG. 5 (PRIOR ART)
FIG. 6 (PRIOR ART)
FIG. 7 (PRIOR ART)
FIG. 8 (PRIOR ART)

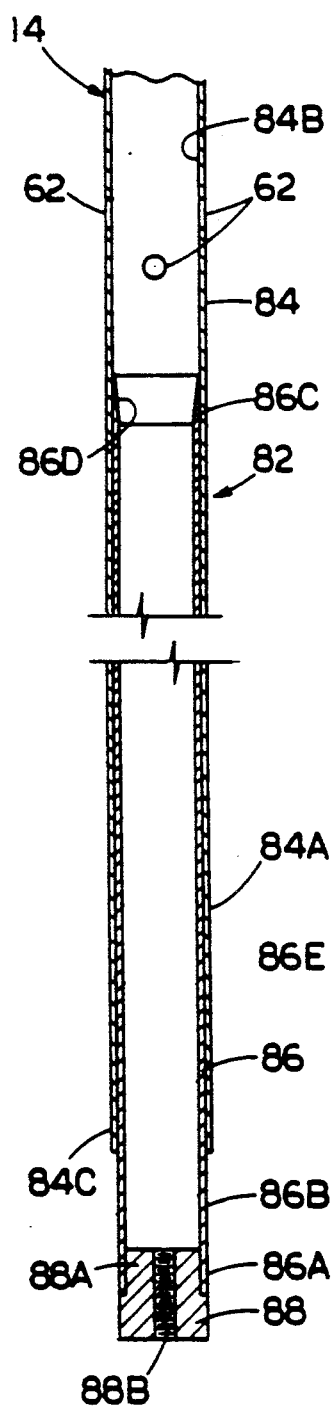
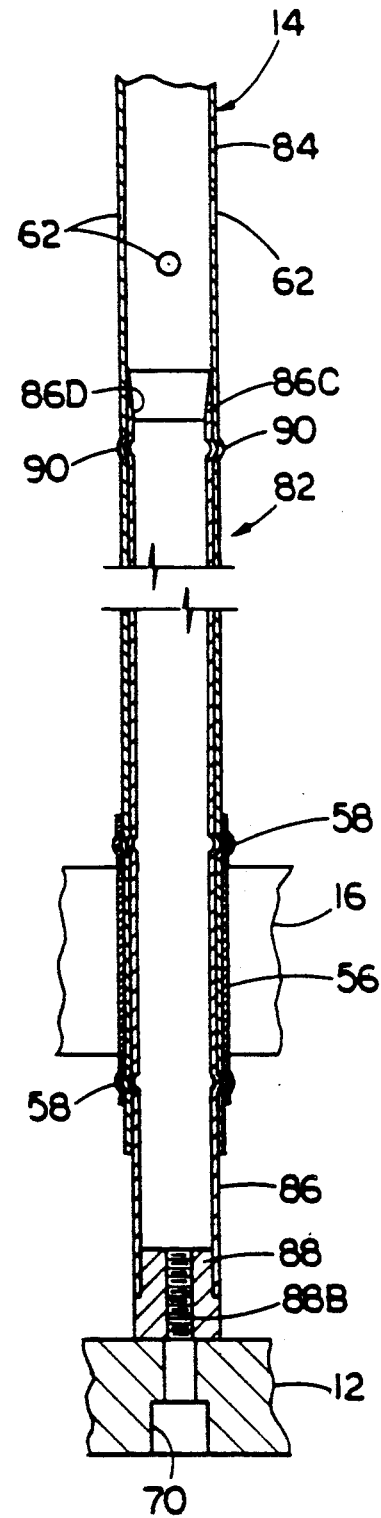
FIG. 12
FIG. 13

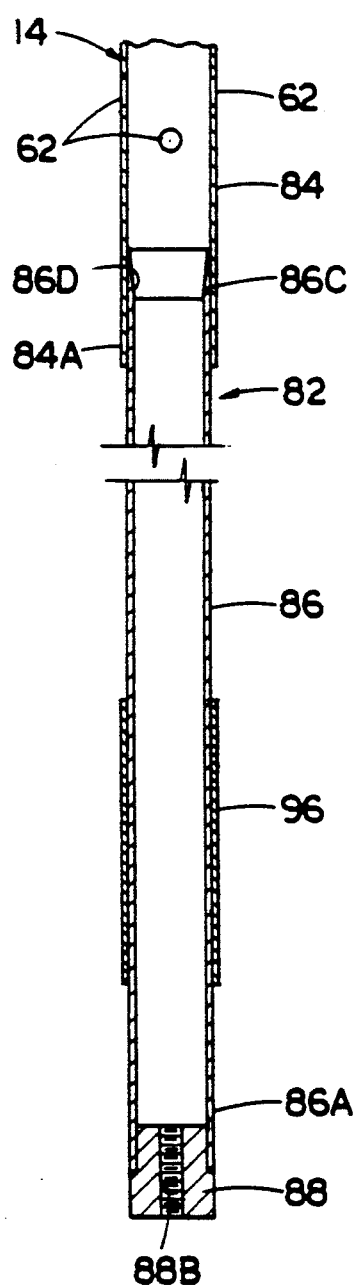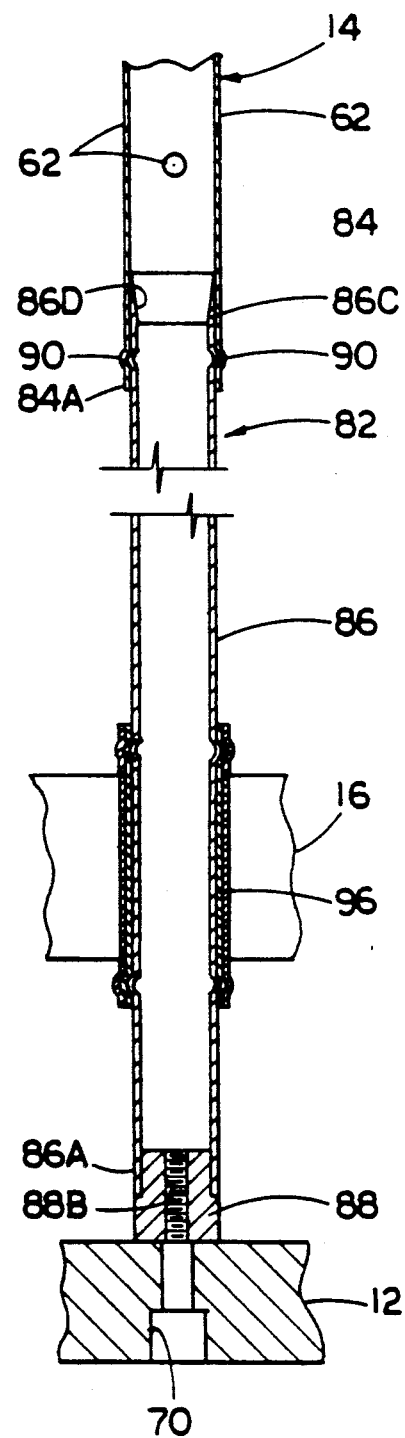
FIG. 18
FIG. 19

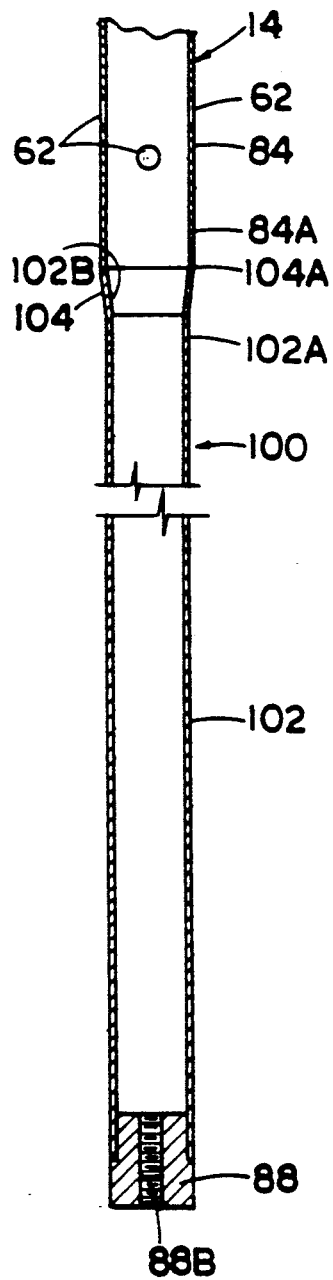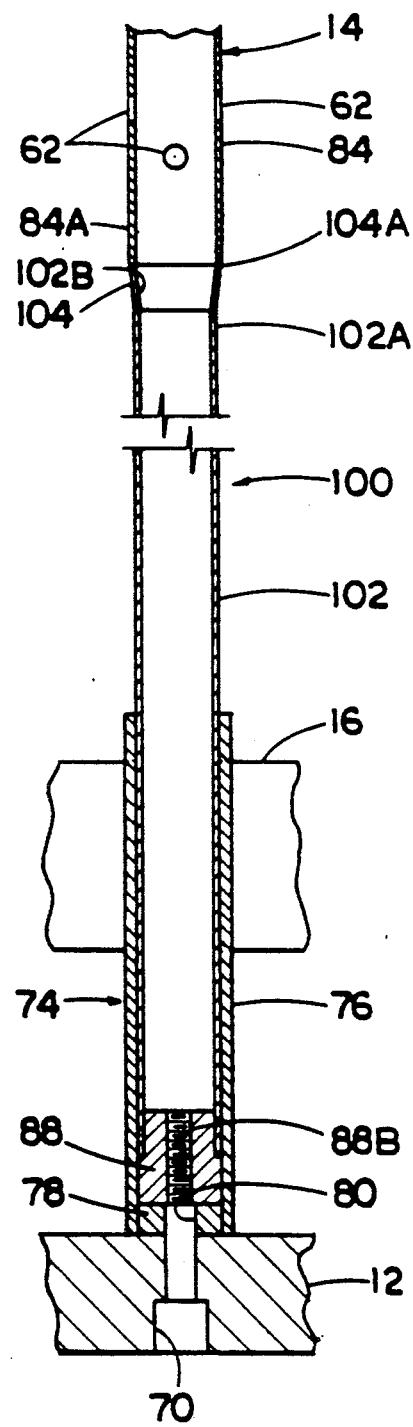
FIG. 24
FIG. 25

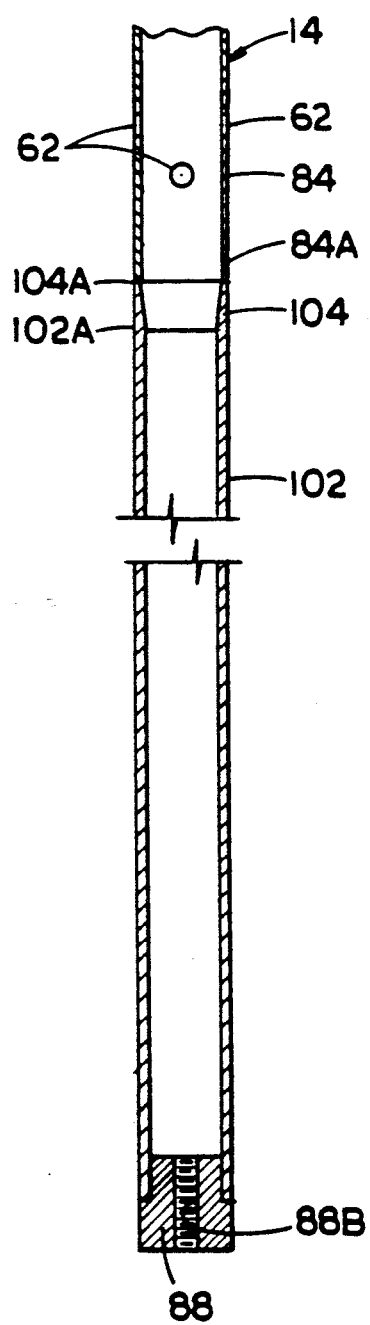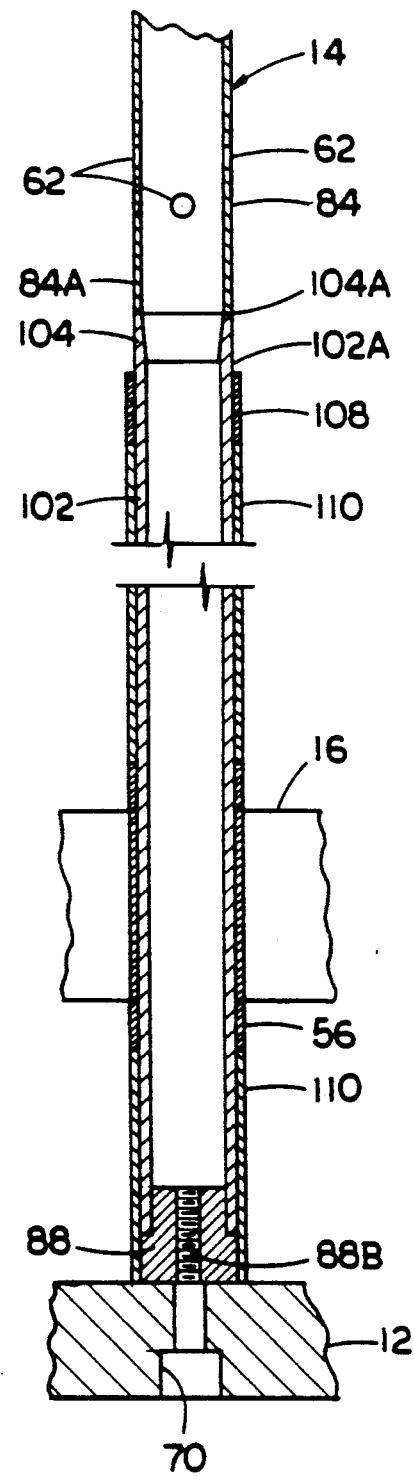
FIG. 26
FIG. 27

DASHPOT CONSTRUCTION FOR A NUCLEAR REACTOR ROD GUIDE THIMBLE

BACKGROUND OF THE INVENTION

1. Field of the Invention

The present invention relates generally to nuclear reactor fuel assemblies, and more particularly, to improved dashpot constructions for a control rod guide thimble of the fuel assembly.

2. Description of the Prior Art

In a typical nuclear reactor, the reactor core includes a large number of fuel assemblies each composed of top and bottom nozzles with a plurality of elongated transversely spaced hollow guide thimbles extending longitudinally between the nozzles and a plurality of transverse support grids axially spaced along and attached to the guide thimbles. A plurality of elongated fuel elements or rods are supported by the transverse grids between top and bottom nozzles and transversely spaced apart from one another and from the guide thimbles. The fuel rods contain fissile material and are grouped by the grids in an array which provides a neutron flux in the core sufficient to support a high rate of nuclear fission and thus the release of a large amount of energy in the form of heat. A liquid coolant is pumped upwardly through the core in order to extract some of the heat generated in the core for the production of useful work.

Clusters of elongated control rods are mounted to drive mechanisms above the fuel assemblies and in alignment with the hollow guide thimbles. During operation of the nuclear reactor, the control rods can be inserted into the fuel assemblies via the channels defined therein by the hollow guide thimbles. The control rods are used to control the nuclear reaction occurring within the fuel assemblies of the reactor core, allowing power level to increase upon withdrawal and reducing power level upon insertion of the control rods.

In case of a need to quickly reduce power in the reactor core, the control rods are released from their drive mechanism and allowed to fall rapidly into the fuel assembly. If not controlled, the impact of the control rods on the fuel assembly could conceivably damage it. Therefore, deceleration and braking of the control rods is accomplished by providing a constriction to the flow of coolant in the form of a reduced diameter lower end portion of each guide thimble. Coolant flowing upwardly through the lower end portion of the guide thimble becomes trapped by the entering control rod forming a dashpot which effectively decelerates and brakes the control rod prior to impact with the fuel assembly.

Historically, the dashpot has been formed by swaging the lower end portion of the guide thimble to a smaller diameter size, leaving the remainder of the guide thimble at the desired diameter size. This process is expensive to perform and forms a conical transition between the reduced diameter lower end portion and the remainder of the tube which is difficult to control.

The reduced diameter lower end portion of the prior art dashpot design also requires additional components to position and attach the lowermost or bottom grid or grids of the fuel assembly in place, further increasing the expense and difficulty of manufacture. The rest of the grids and a top nozzle fitting are assembled and joined by means for a bulged mechanical swaging of the guide thimble onto a plurality of identical larger sleeves that attach to the grids and to the top nozzle.

Consequently, a need exists for an alternative approach to dashpot construction so as to overcome the problems associated with the prior art dashpot design. One approach is disclosed in U.S. Pat. No. 4,655,990 to Leclercq wherein the constriction is formed by insertion of a smaller diameter tube or tube sections inside the lower end portion of the guide thimble. While the particular constructions of this patent provide a start in the right direction, they are not perceived as an optimum solution to all of the problems.

SUMMARY OF THE INVENTION

The present invention provides improved dashpot constructions designed to satisfy the aforementioned needs. The objective of the present invention is to fabricate the dashpot from a main tube of the guide thimble and an auxiliary tube of the proper size with little or no additional processing of the tubes so employed. The embodiments of the dashpot constructions of the present invention accomplish this objective with no more than a weld or bulge joint to join the main and auxiliary tubes and an end flare provided on the auxiliary tube to form the transition. Some of the embodiments provide an outside diameter which is a continuation of the same outside diameter of the main tube of the guide thimble, whereas others provide a smaller outside diameter requiring the addition of the same components for attachment of the bottom grid(s) as used heretofore.

Accordingly, the present invention relates to a dashpot in a control rod guide thimble having an elongated main hollow tube. The dashpot comprises: (a) a lower tubular portion of the main tube; (b) an auxiliary hollow tube inserted in the lower portion of the main tube and having an outside diameter slightly less than an inside diameter of the main tube to permit a close fitting relationship between an exterior surface of the auxiliary tube and an interior surface of the main tube lower portion; and (c) an end plug attached to a lower end portion of the auxiliary tube. The auxiliary tube has an upper end portion with an inside surface portion in axial cross-section flaring upwardly and outwardly to provide a tapered transition extending between and connecting an interior surface of the auxiliary tube with the exterior surface thereof. Several embodiments of the dashpot are disclosed.

These and other features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

In the course of the following detailed description, reference will be made to the attached drawings in which:

FIG. 3 is an enlarged fragmentary sectional view of one of the prior art guide thimbles of the fuel assembly of FIG. 1, showing a dashpot formed in the lower end portion of the hollow guide thimble and a lower portion of one control rod extending into the dashpot.

FIG. 4 is an enlarged fragmentary sectional view of the support grid of FIG. 2 showing one of the grid sleeves connected to the straps of the grid.

FIG. 5 is a sectional view of one of the grid support tubes to which is attached the lowermost grid of the fuel assembly for mounting the lowermost grid in the desired position above a bottom nozzle of the fuel assembly.

FIG. 6 is an enlarged fragmentary sectional view of the bottom nozzle of the fuel assembly of FIG. 1.

FIG. 7 is a side elevational view of a fastener for attaching the guide thimble and grid support tube to the bottom nozzle of the fuel assembly of FIG. 1.

FIG. 8 is a bottom plan view of the fastener as seen along line 8—8 of FIG. 7.

FIG. 12 is a fragmentary sectional view of a preferred embodiment of an improved dashpot construction of the present invention.

FIG. 13 is a fragmentary sectional view of the dashpot construction of FIG. 12 with the prior art grid sleeve of FIG. 9 assembled thereto and mounting the lowermost grid to the dashpot.

FIG. 18 is a fragmentary sectional view of a third alternate embodiment of the improved dashpot construction of the present invention.

FIG. 19 is a fragmentary sectional view of the dashpot construction of FIG. 18 with the prior art grid sleeve of FIG. 9 assembled thereto and mounting the lowermost grid to the dashpot.

FIG. 24 is a fragmentary sectional view of a sixth alternate embodiment of the improved dashpot construction of the present invention FIG. 25 is a fragmentary sectional view of the dashpot construction of FIG. 24 with the prior art grid support tube of FIG. 11 assembled thereto and mounting the lowermost grid to the dashpot.

FIG. 26 is a fragmentary sectional view of a seventh alternate embodiment of the improved dashpot construction of the present invention.

FIG. 27 is a fragmentary sectional view of the dashpot construction of FIG. 26 with an improved grid support assembly assembled thereto and mounting the lowermost grid to the dashpot.

DESCRIPTION OF THE PREFERRED EMBODIMENTS

Figure 1:
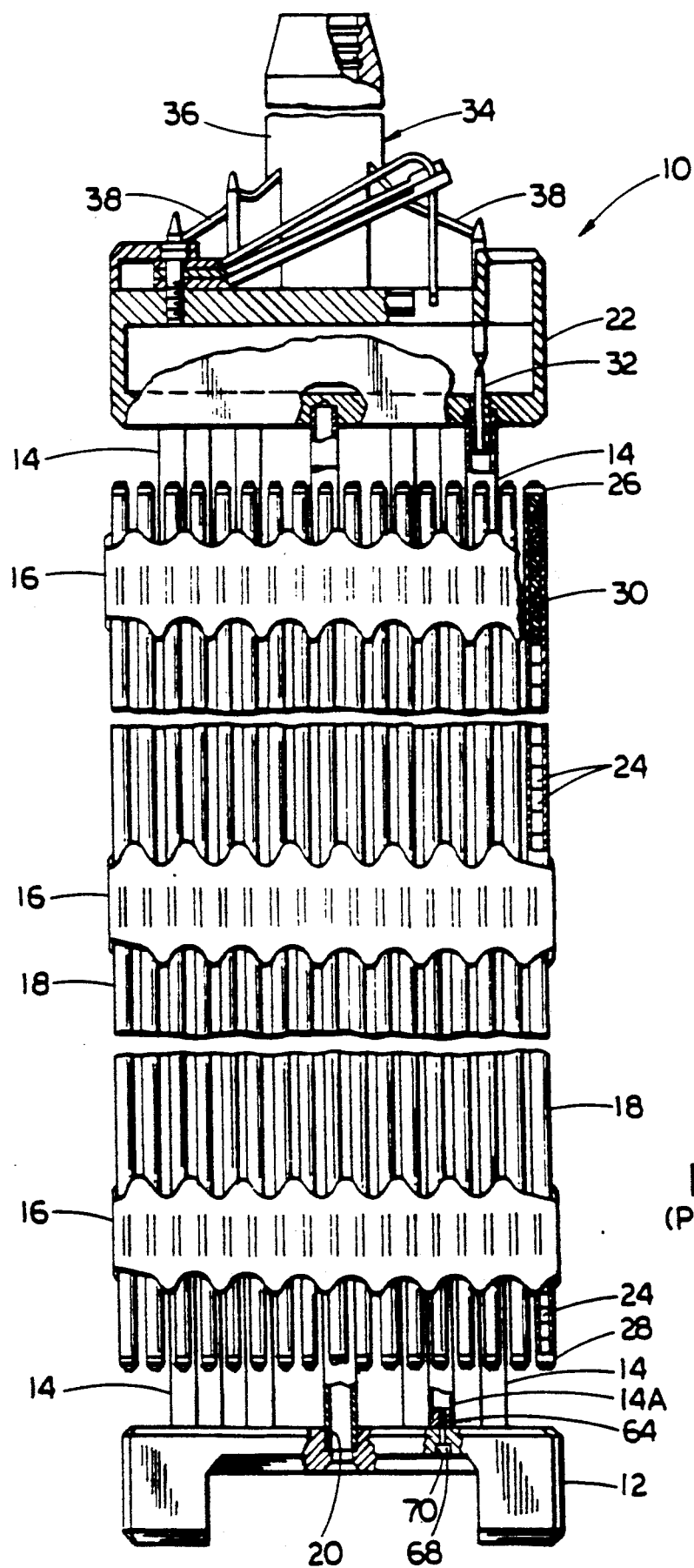
FIG. 1 is a side elevational view, with parts partially sectioned and broken away for purposes of clarity, of a prior art fuel assembly in which the improved dashpot constructions of the present invention can be used.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Referring now to the drawings, and particularly to FIG. 1, there is shown an elevational view of a prior art nuclear reactor fuel assembly, represented in vertically foreshortened form and being generally designated by the numeral 10, to which the improved dashpot constructions of the present invention can be applied. The fuel assembly 10 is the type used in a pressurized water reactor (PWR) and basically includes a lower end structure or bottom nozzle 12 for supporting the assembly on the lower core plate (not shown) in the core region of a reactor (not shown), and a number of longitudinally extending hollow guide tubes or thimbles 14 which project upwardly from the bottom nozzle 12.

The assembly 10 further includes a plurality of transverse grids 16 axially spaced along and supported by the guide thimbles 14 and a plurality of elongated fuel rods 18 transversely spaced and supported in an organized array by the grids 16. Also, the assembly has an instrumentation tube 20 located in the center thereof and an upper end structure or top nozzle 22 attached to the upper ends of the guide thimbles 14. With such arrangement of parts, the fuel assembly 10 forms an integral assembly capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the PWR. A liquid moderator coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 has associated therewith a rod cluster control mechanism 34 having an internally threaded cylindrical member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

Prior Art Grid Construction

Figure 2:
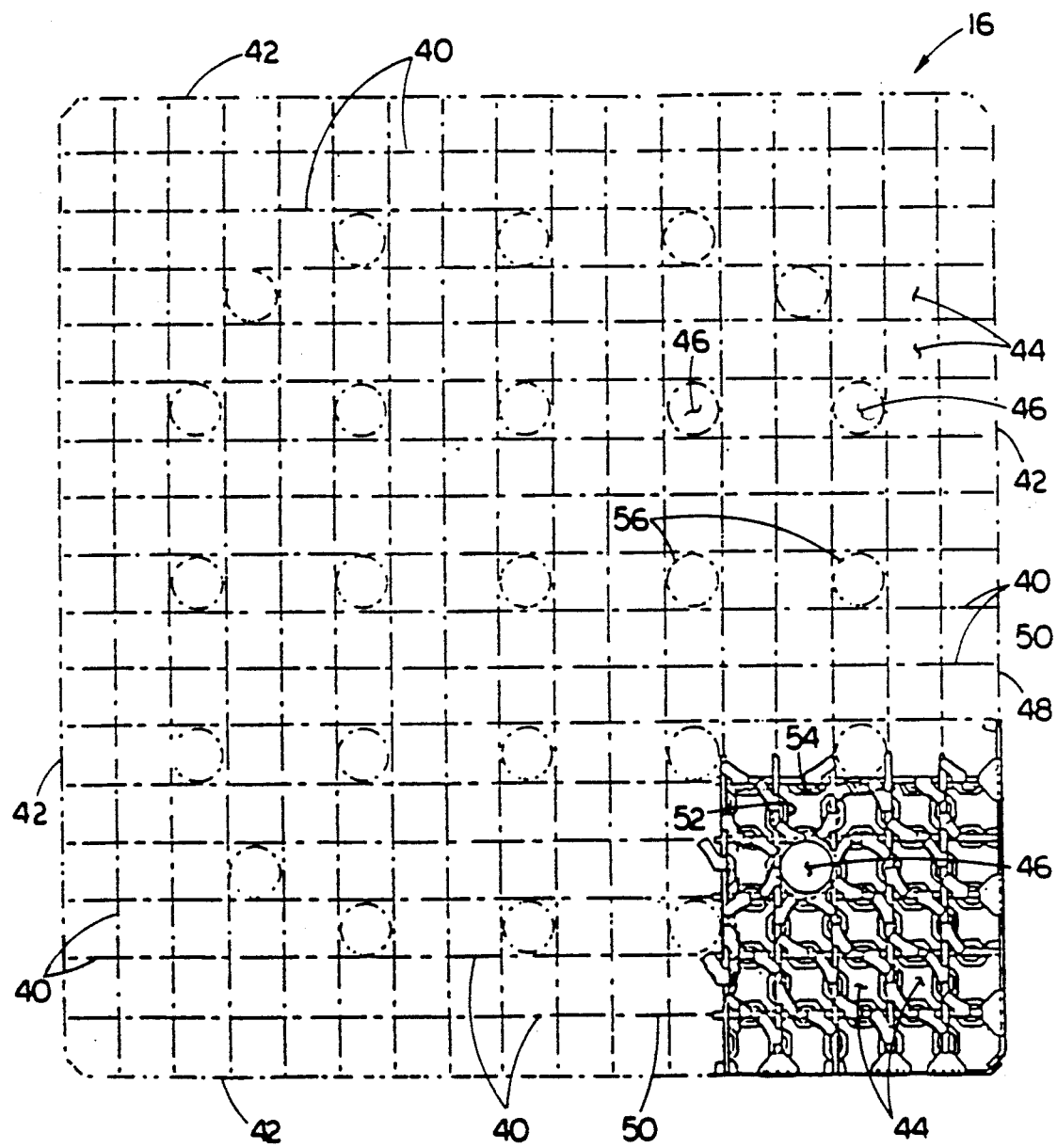
FIG. 2 is an enlarged plan view of one of the prior art support grids of the fuel assembly of FIG. 1.

Referring to FIG. 2, there is shown one of the transverse fuel rod grids 16 in greater detail. Basically, the grid 16 is composed of a plurality of inner and outer straps 40,42. The straps 40,42 are interleaved with one another in an egg-crate configuration to form a matrix of hollow cells 44 and a plurality of openings 46. At their intersections, the straps 40,42 are suitably secured together, such as by welding.

The hollow cells 44 of the grid 16 receive therethrough respective ones of the fuel rods 18. Each grid cell 44 receiving one fuel rod 18 is defined by pairs of opposing wall sections. The wall sections 48 compose the outer straps 42. The wall sections 50 compose the inner straps 44 and are shared with adjacent cells 44.

The wall sections 50 of the inner straps 40 have integrally formed thereon in association with each cell 44 a pair of upper and lower horizontally extending and vertically spaced dimples 52 and a middle spring 54 spaced from and located between the dimples 52. The dimples 52 and springs 54 of each cell 44 protrude into the cell and engage and support the fuel rod 18 extending through the cell.

Figure 9:
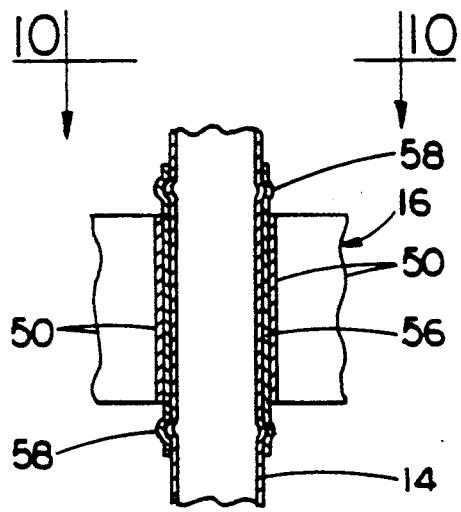
FIG. 9 is an enlarged fragmentary sectional view of a prior art grid sleeve mounting one of the grids and bulge fitted to one guide thimble both above and below the grid.
Figure 10:
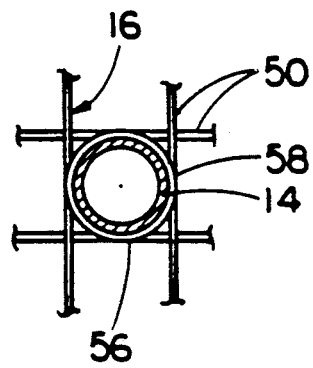
FIG. 10 is a cross sectional view taken along line 10—10 of FIG. 9.

Referring to FIGS. 2 and 4, the openings 46 of the grid 16 do not have dimples 52 and springs 54 protruding into them. Instead, grid openings 46 have hollow tubular sleeves 56 inserted therethrough and attached to the wall sections 50 of the inner straps 40 which define the openings 46. As seen in FIGS. 9 and 10, the grid sleeves 56 receive the guide thimbles 14 and are mechanically attached thereto by formation of interlocking bulges 58 in contiguous portions of the walls of the guide thimbles 14 and grid sleeves 56 both above and below the grid 16. In such manner, all but the lowermost one(s) of the grids 16 are disposed along and attached to the guide thimbles 14.

Prior Art Dashpot Construction

Figure 11:
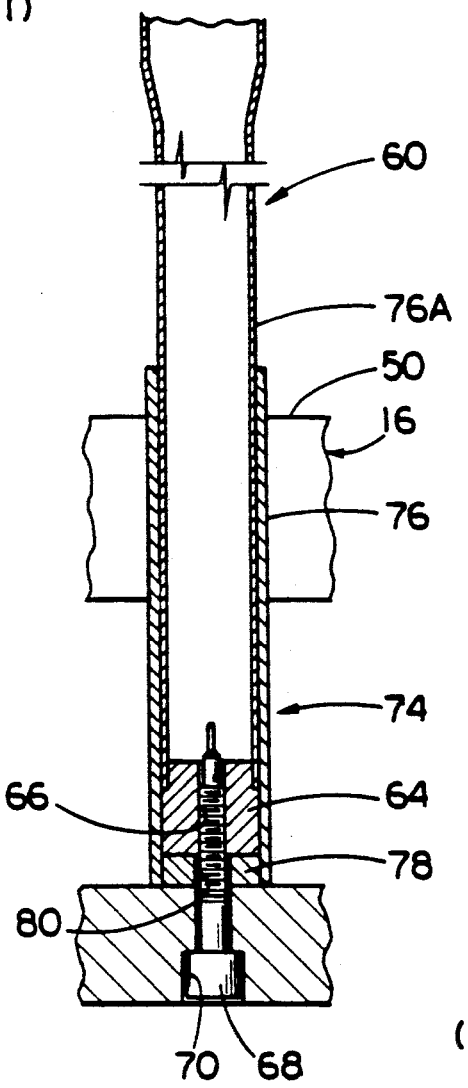
FIG. 11 is a fragmentary sectional view of the dashpot of the prior art guide thimble of FIG. 3 with one of the prior art grid support tubes assembled thereto and mounting the lowermost grid in the desired position above the bottom nozzle of the fuel assembly of FIG. 1.

Referring to FIGS. 3 and 11, there is illustrated the prior art construction of a dashpot 60 at the lower end portion of the guide thimble 14. The dashpot 60 is a section of the guide thimble 14 having a reduced diameter compared to the remainder thereof. During a reactor scram occurrence, the reduced diameter dashpot 60 causes a constriction in the coolant flow path upwardly through the guide thimble 14 and produces a braking or deceleration of the movement of a control rod 32 falling through the one guide thimble 14 near the end of its travel. A plurality of holes 62, such as four in number, are provided in the guide thimble 14 above the dashpot 60 to permit increased flow of coolant from the guide thimble 14 to reduce the drop time of the control rod 32.

Referring to FIGS. 1, 3, 6-8 and 11, the lower end 14A of the guide thimble 14 is fitted with a cylindrical end plug 64 having an upper annular reduced diameter section 64A and a central internally threaded bore 66. The lower guide thimble end 14A receives the upper section 64A of the end plug 64 and is fixed thereto, such as by welding. As seen in FIGS. 1 and 11, the guide thimble 14 is fastened and secured to the bottom nozzle 12 by a retaining screw 68 inserted through a countersunk bore 70 in the bottom nozzle 12 and threaded into the threaded bore 66 of the guide thimble end plug 64. The retaining screw 68 has a central passage 72 formed through it to allow coolant to flow from below the bottom nozzle 12 up through the guide thimble 14.

Prior Art Lowermost Grid Mounting Assembly

Referring to FIGS. 5 and 11, there is shown a prior art mounting assembly 74 which needs to be used to mount the lowermost transverse grid(s) 16 to the dashpot 60 of the guide thimble 14. It will be recalled that the dashpot 60 is produced at the lower end portion of each guide thimble 14 by reduction in its diameter. Since the grids 16 have the same construction throughout the fuel assembly 10 and in view that the guide thimble locations where grid sleeves 56 of the upper ones of the grids 14 are bulge fitted to the guide thimble 14 have a larger diameter than the dashpot 60, the use of the assembly 74 is necessary to, in effect, supplement and increase the outside diameter of the guide thimble "seen" by the lowermost grid(s) to the same outside diameter size as the rest of the guide thimble.

More particularly, each grid mounting assembly 74 includes an elongated hollow support tube 76 and a cylindrical annular washer 78 fitted and fixed within one end of the tube 76. The washer 78 has a central hole 80 which permits passage of the retaining screw 68. Similar to the grid sleeve 56 described earlier, the support tube 76 of each assembly 74 extends through the opening(s) 46 of the lowermost grid(s) 16 and is secured to the grid inner strap wall sections 50 defining the opening(s). The grid support tube 76 has greater wall thickness than the grid sleeve 56 since the tube 76 is not only duplicating the presence of the grid sleeve 56 but also making up for the difference between the original outside diameter of the guide thimble 14 and the reduced outside diameter of the dashpot 60.

The grid mounting assembly 74 is inserted at the upper open end 76A of the support tube 76 over the end plug 64 and lower end of the guide thimble 14 with the washer 78 of the assembly 74 becoming disposed between the guide thimble lower end plug 64 and the bottom nozzle 12. When the end plug 64 is secured by the retaining screw 68 to the bottom nozzle 12, the washer 78 is thus clamped therebetween. In such manner, the grid support tube 76 of the assembly 74 mounts the lowermost grid(s) 16 in the desired position above a bottom nozzle 12 of the fuel assembly 10, as shown in FIG. 11.

Improved Dashpot Constructions of Present Invention

FIG. 12 illustrates a preferred embodiment of an improved dashpot of the present invention, generally designated 82, formed on the lower end portion of a guide thimble 14. The improved dashpot 82 is provided in each one of the guide thimbles 14. The guide thimble 14 has an elongated main hollow tube 84 which defines a substantial portion of the length thereof.

More particularly, in its basic construction, the dashpot 82 includes a lower tubular portion 84A of the main hollow tube 84, an auxiliary hollow tube 86 inserted in the lower portion 84A of the main hollow tube 84, and an end plug 88 attached to a lower end 86A of the auxiliary tube 86. The auxiliary tube 86 of the dashpot 82 has an outside diameter slightly less than an inside diameter of the main tube 84 to permit a close fitting relationship between an exterior surface 86B of the auxiliary tube 86 and an interior surface 84B of the main tube lower portion 84A. Further, the auxiliary tube 86 has an upper end portion 86C with an inside surface portion 86D in axial cross-section flaring upwardly and outwardly to provide a tapered transition extending between and connecting an interior surface 86E of the auxiliary tube 86 with the exterior surface 86B thereof.

The end plug 88 of the dashpot 82 has an upper annular reduced diameter section 88A which receives and is fixed to the lower end 86A of the auxiliary tube 86, such as by brazing or welding. Further, the end plug 88 has a central internally-threaded bore 88B for receiving the retaining screw (not shown). The main tube 84 at its lower end 84C terminates a short distance above the end plug 88 on the auxiliary tube 86.

FIG. 13 depicts the guide thimble 14 with the preferred dashpot 82 of FIG. 12 mounting the lowermost grid 16 by use of a grid sleeve 56 in the same way as the rest of the grids 16 are mounted to the guide thimble 14, as was shown in FIG. 9. The grid sleeve 56 and the main and auxiliary tubes 84, 86 are mechanically interfitted together by formation of bulges 58 in the contiguous wall portions thereof adjacent to and both above and below the lowermost one of the grids 16. Also, the guide thimble 14 is shown mounted on the bottom nozzle 12 (with the retaining screw being omitted).

Further, the main and auxiliary tubes 84, 86 are shown mechanically interfitted together adjacent to and below the upper end portion 86C of the auxiliary tube 86 which forms the dashpot transition. Preferably, the main and auxiliary tubes are mechanically interfitted by a plurality of bulges 90 swaged in wall portions thereof.

Figure 14:
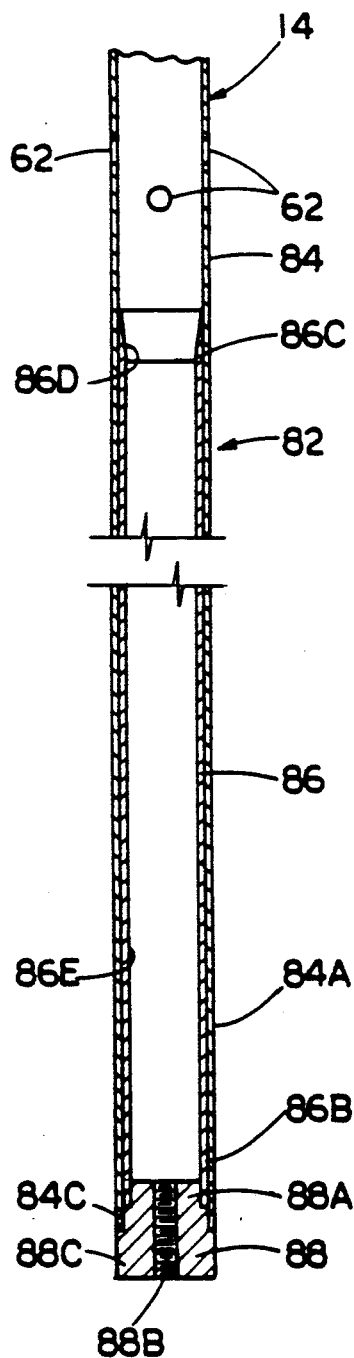
FIG. 14 is a fragmentary sectional view of a tirst alternate embodiment of the improved dashpot construction of the present invention.
Figure 15:
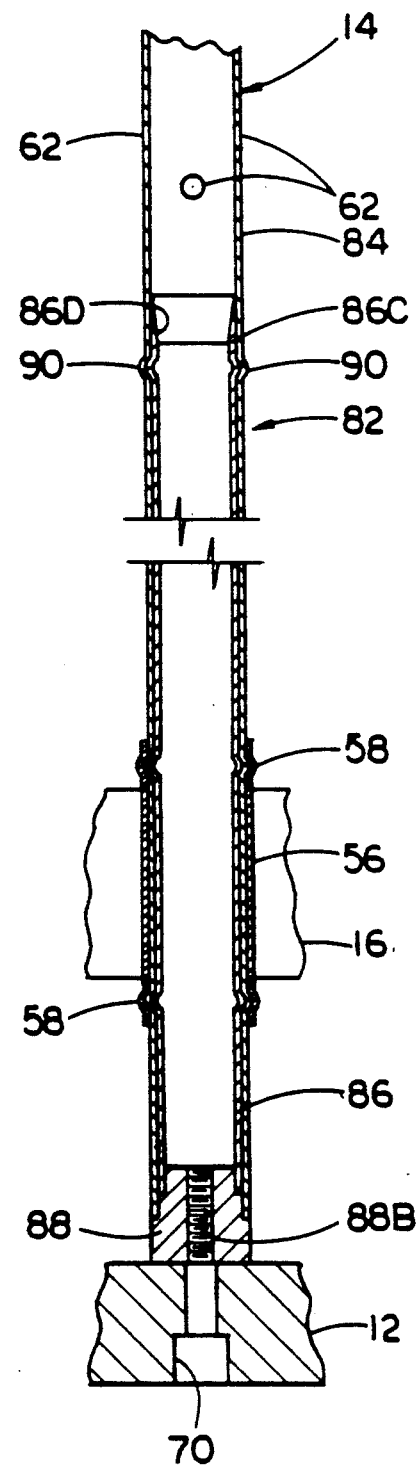
FIG. 15 is a fragmentary sectional view of the dashpot construction of FIG. 14 with the prior art grid sleeve of FIG. 9 assembled thereto and mounting the lowermost grid to the dashpot.

FIGS. 14 and 15 illustrate a first alternate embodiment of the improved dashpot of the present invention, being generally designated 82, having the same construction and mounting the lowermost grid 16 in the same way as dashpot 82 of FIGS. 12 and 13 except for the following differences. First, the lower portion 84A of the main tube 84 extends below the lower end 86A of the auxiliary tube 86. Second, the end plug 88 has a pair of upper reduced diameter sections 88A, 88C in a steplike formation which receive and are fixed to the lower ends 84C, 86A of the main and auxiliary tubes 84, 86.

Figure 16:
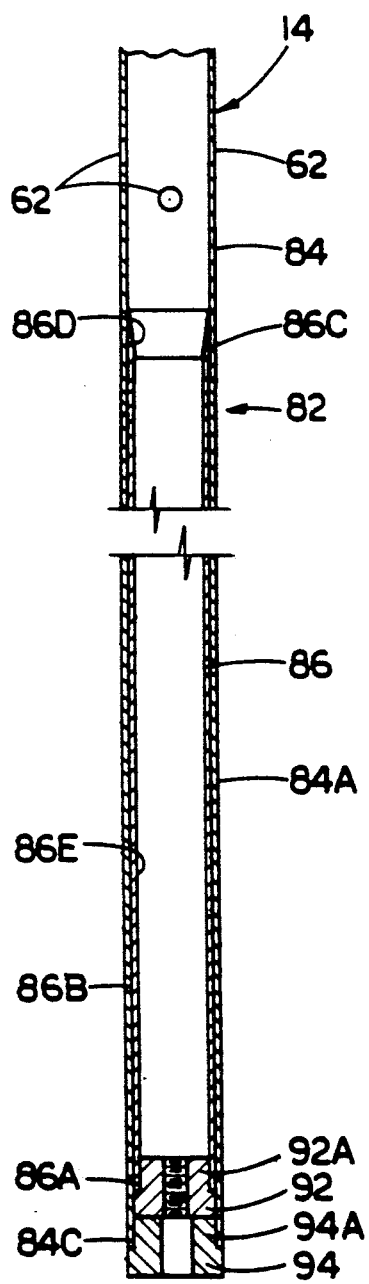
FIG. 16 is a fragmentary sectional view of a second alternate embodiment of the improved dashpot construction of the present invention.
Figure 17:
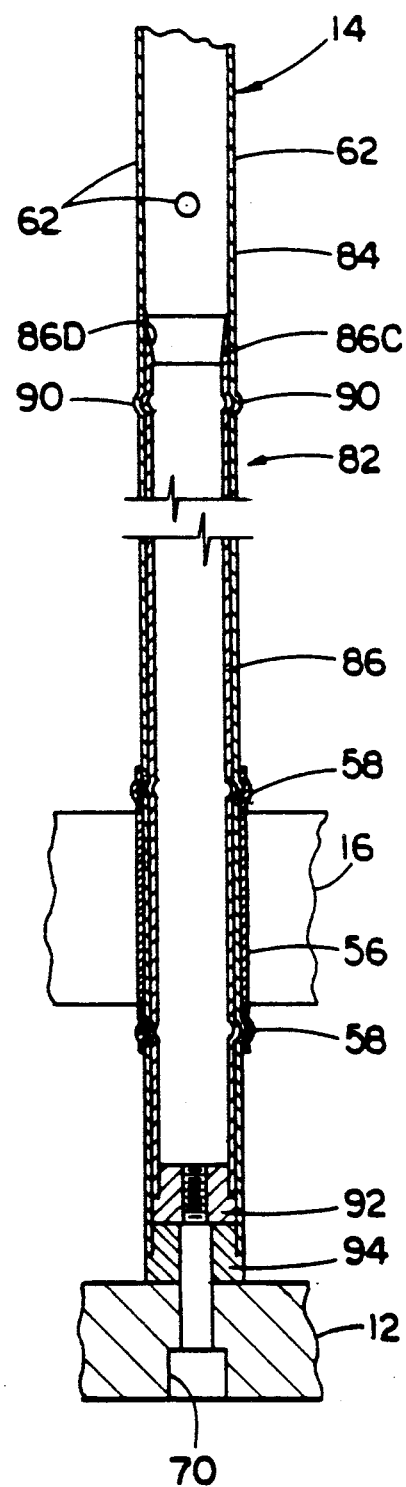
FIG. 17 is a fragmentary sectional view of the dashpot construction of FIG. 16 with the prior art grid sleeve of FIG. 9 assembled thereto and mounting the lowermost grid to the dashpot.

FIGS. 16 and 17 illustrate a second alternate embodiment of the improved dashpot of the present invention, being generally designated 82, having the same construction and mounting the lowermost grid 16 in the same way as dashpot 82 of FIGS. 14 and 15 except for the following difference. The end plug 88 of FIGS. 14 and 15 is now composed of two separate parts, an inner plug part 92 fixed to the lower end 86A of the auxiliary tube 86 and an outer plug part 94 fixed to the lower end 84C of the main tube 84. The plug parts 92, 94 have respective upper reduced diameter sections 92A, 94A receiving respective lower ends 86A, 84C of the auxiliary and main tubes 86, 84.

FIGS. 18 and 19 illustrate a third alternate embodiment of the improved dashpot of the present invention, being generally designated 82, having the same construction as dashpot 82 of FIGS. 12 and 13 except for the following difference. The lower portion 84A of the main tube 84 terminates above the location of the lowermost grid 16 and immediately below the location of the upper portion 86C of the auxiliary tube 86 and the bulges 90. Thus, the lower portion 84A of the main tube 84 does not provide part of the structure mounting the lowermost grid 16. Instead, a separate intermediate grid sleeve 96 is provided between the grid sleeve 56 and the auxiliary tube 86 and mechanically attached thereto by bulges 58.

Figure 20:
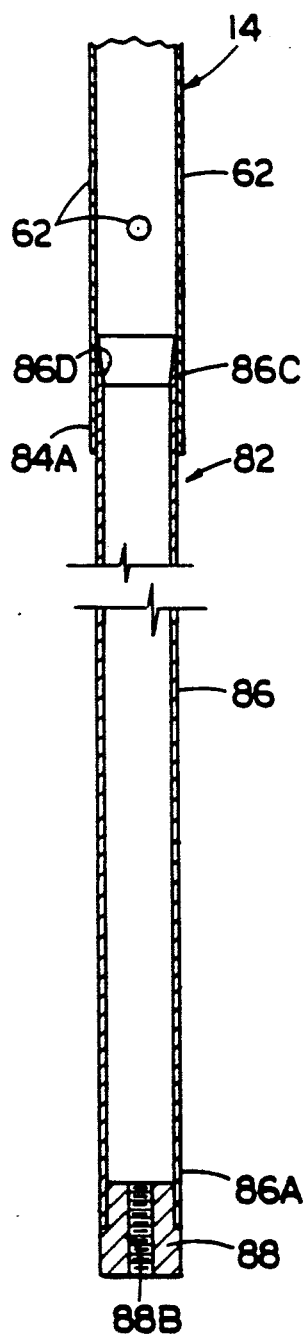
FIG. 20 is a fragmentary sectional view of a fourth alternate embodiment of the improved dashpot construction of the present invention.
Figure 21:
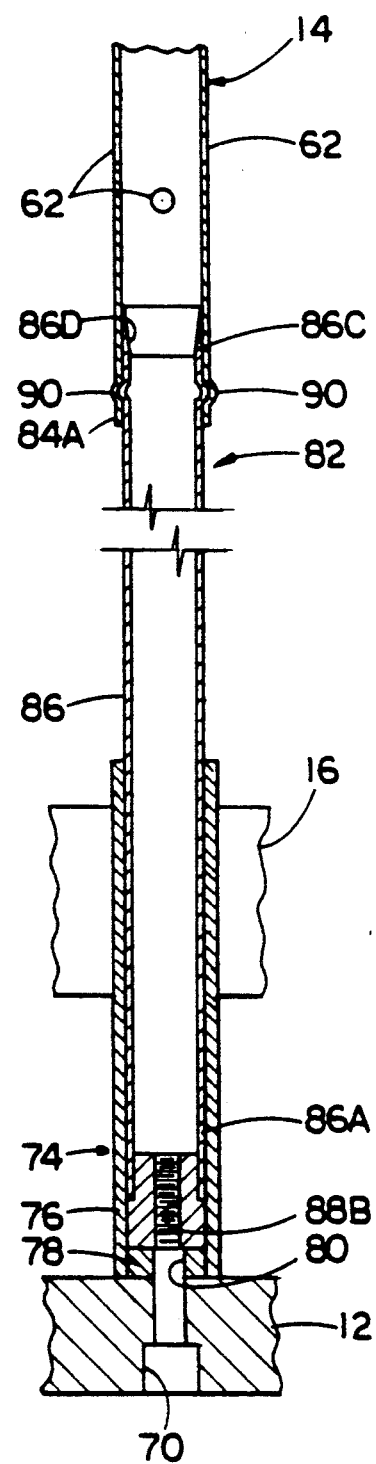
FIG. 21 is a fragmentary sectional view of the dashpot construction of FIG. 20 with the prior art grid support tube of FIG. 11 assembled thereto and mounting the lowermost grid to the dashpot.

FIGS. 20 and 21 illustrate a fourth alternate embodiment of the improved dashpot of the present invention, generally designated 82, having the same construction as dashpot 82 of FIGS. 18 and 19 but mounting the lowermost grid 16 in a different way. Instead, the lowermost grid 16 is mounted to the dashpot 82 using the prior art grid mounting assembly 74 of FIG. 11, as described earlier.

Figure 22:
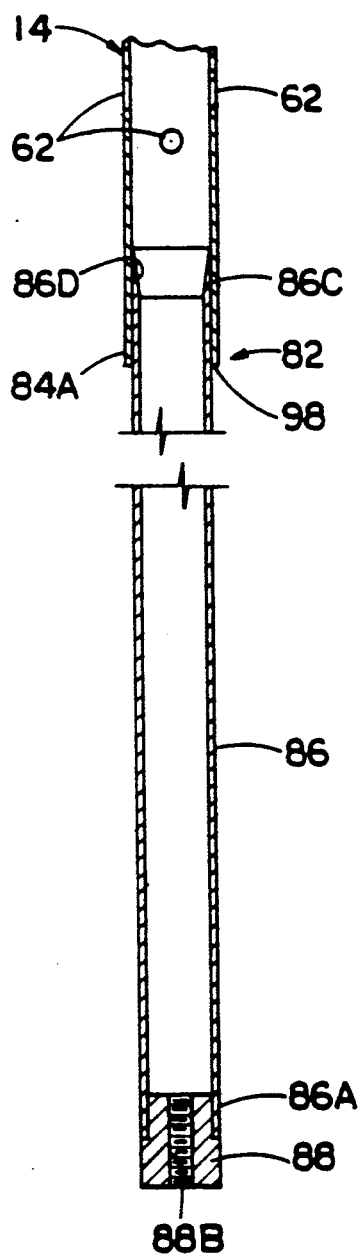
FIG. 22 is a fragmentary sectional view of a fifth alternate embodiment of the improved dashpot construction of the present inventio.
Figure 23:
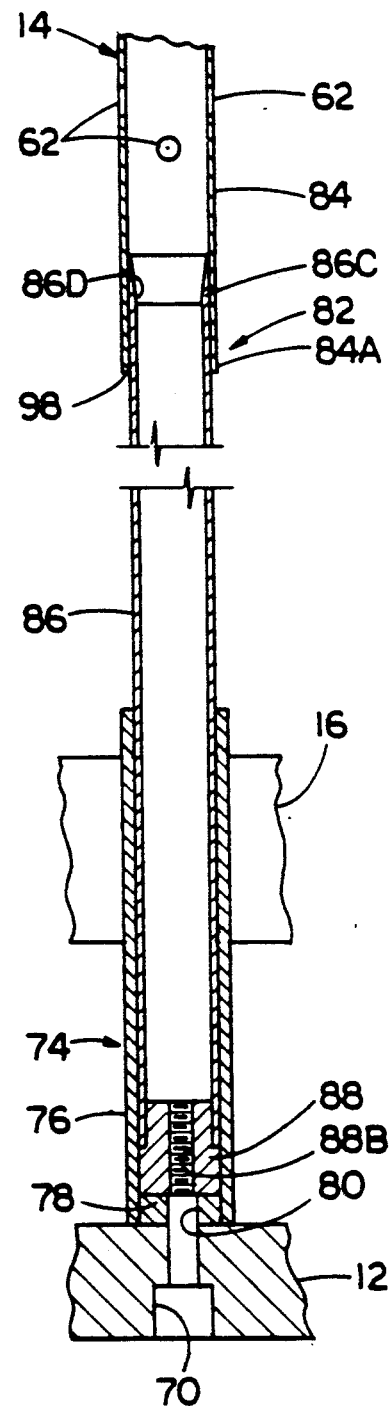
FIG. 23 is a fragmentary sectional view of the dashpot construction of FIG. 22 with the prior art grid support tube of FIG. 11 assembled thereto and mounting the lowermost grid to the dashpot.

FIGS. 22 and 23 illustrate a fifth alternate embodiment of the improved dashpot of the present invention, generally designated 82, having the same construction as dashpot 82 of FIGS. 16 and 17 and mounting the lowermost grid 16 in the same way, except for the following difference. Instead of the lower portion 84C of the main tube 84 and the upper end portion 86C of the auxiliary tube 86 being mechanically fitted together, they are welded together at location 98.

FIGS. 24 and 25 illustrate a sixth alternate embodiment of the improved dashpot of the present invention, generally designated 100. The dashpot 100 is composed of an auxiliary tube 102 having an upper flared portion 104 rigidly connected, such as by a butt weld 104A at circumferential location 106 the lower end 84C of the main tube 84. The flared portion 104 defines the transition of the dashpot 100. The lowermost grid 16 is mounted to the dashpot 100 the prior art grid mounting assembly 74 of FIG. 11, as described earlier.

FIGS. 26 and 27 illustrate a seventh alternate embodiment of the improved dashpot of the present invention, generally designated 100, having a similar construction to that of FIGS. 24 and 25, except that the auxiliary tube 102 has a thicker wall making its outside diameter the same as the main tube 84. Also, the auxiliary tube 102 has an upper portion 102A with a flared surface portion 102B similar to that of the auxiliary tube 86 of FIGS. 13-23. FIG. 27 also illustrates an improved grid support assembly 106 assembled to the dashpot 100 and mounting the lowermost grid 16 thereto. Specifically, the improved assembly 106 includes an upper ring 108 attached about the exterior surface of the upper end portion of the auxiliary tube 102 and a pair of annular spacers 110 about the grid sleeve 56 above and below the same.

It is thought that the present invention and many of its attendant advantages will be understood from the foregoing description and it will be apparent that various changes may be made in the form, construction and arrangement of the parts of the invention described herein without departing from the spirit and scope of the invention or sacrificing all of its material advantages, the forms hereinbefore described being merely preferred or exemplary embodiments thereof.

I claim:

1. In a control rod guide thimble having a main hollow tube defining a substantial portion of the length of said guide thimble, a dashpot comprising:

(a) a lower tubular portion of said main hollow tube; and (b) an auxiliary hollow tube having concentric exterior and interior surfaces, said auxiliary tube being inserted in said lower portion of said main hollow tube and having an outside diameter slightly less than an inside diameter of said main tube to permit a close fitting relationship between said exterior surface of said auxiliary tube and an interior surface of said main tube lower portion, said auxiliary tube having an upper end portion with an inside surface portion in axial cross-section flaring in inclined relation upwardly and outwardly to provide a tapered transition extending between and connecting said interior surface of the auxiliary tube with said exterior surface thereof; and (c) an end plug attached to a lower end of said auxiliary tube.

2. The dashpot as recited in claim 1, wherein said main and auxiliary tubes are mechanically interfitted together adjacent to and below said upper end portion of said auxiliary tube.

3. The dashpot as recited in claim 2, wherein said main and auxiliary tubes are mechanically interfitted by a plurality of bulges formed in contiguous wall portions thereof.

4. The dashpot as recited in claim 2, wherein said lower portion of said main tube terminates immediately below said upper end portion of said auxiliary tube and below where said main and auxiliary tubes are mechanically interfitted together.

5. The dashpot as recited in claim wherein said main tube terminates at a lower end spaced above said end plug on said auxiliary tube.

6. The dashpot as recited in claim 1, wherein said end plug has an upper annular reduced diameter section which receives and is fixed to said lower end of said auxiliary tube.

7. The dashpot as recited in claim 6, wherein said end plug has a central internally-threaded bore for receiving a fastener.

8. The dashpot as recited in claim 1, wherein said main tube terminates at a lower end extending below said lower end of said auxiliary tube.

9. The dashpot as recited in claim 8, wherein said end plug has a pair of upper reduced diameter sections provided in a step-like formation which receive and are fixed to said lower ends of said main and auxiliary tubes.

10. The dashpot as recited in claim 1, wherein said main and auxiliary tubes are mechanically interfitted together adjacent to and both above and below the location therealong of a support grid.

11. The dashpot as recited in claim 8, wherein said end plug is composed of two parts, an inner plug part fixed to said lower end of said auxiliary tube and an outer plug part fixed to said lower end of said main tube.

12. The dashpot as recited in claim 11, wherein said inner and outer plug parts have respective upper reduced diameter sections receiving respective lower ends of said auxiliary and main tubes.

13. The dashpot as recited in claim 2, wherein said lower portion of said main tube terminates immediately below said upper end portion of said auxiliary tube and below where said main and auxiliary tubes are welded together.

14. In a control rod guide thimble having a main hollow tube defining a substantial portion of the length of said guide thimble, a dashpot comprising:

(a) a lower tubular portion of said main hollow tube; and (b) an auxiliary hollow tube having concentric exterior and interior surfaces and an upper end connected by a butt weld to a lower end of said main tube lower portion, said auxiliary tube having an upper end portion with an inside surface portion in axial cross-section flaring in inclined relation upwardly and outwardly to provide a tapered transition extending between and connecting said interior surface of said auxiliary tube with said lower end of said main tube; and (c) an end plug attached to a lower end of said auxiliary tube.

15. The dashpot as recited in claim 14, wherein said auxiliary tube has an outside diameter less than an outside diameter of said main tube.

16. The dashpot as recited in claim 14, wherein said auxiliary tube has an outside diameter substantially equal to said outside diameter of said main tube.

17. The dashpot as recited in claim 14, wherein said upper end portion of said auxiliary tube also has an outside surface portion in axial cross-section flaring upwardly and outwardly to provide a tapered transition extending between and connecting with said lower end of said main tube.

18. The dashpot as recited in claim 17, wherein said auxiliary tube has a thicker wall than said main tube.

19. The dashpot as recited in claim 17, further comprising:

a grid support assembly for mounting a support grid to said auxiliary tube, said assembly including an upper ring attached about an exterior surface of an upper end portion of said auxiliary tube and a pair of annular spacers disposed about said auxiliary tube above and below the grid.

* * * * *